US006853354B2

United States Patent
Asamura

(10) Patent No.: US 6,853,354 B2
(45) Date of Patent: Feb. 8, 2005

(54) MULTI DISPLAY PROJECTOR

(75) Inventor: Yoshinori Asamura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 249 days.

(21) Appl. No.: 10/014,588

(22) Filed: Dec. 14, 2001

(65) Prior Publication Data
US 2002/0093626 A1 Jul. 18, 2002

(30) Foreign Application Priority Data
Jan. 15, 2001 (JP) .......................... 2001-006850

(51) Int. Cl.[7] .......................... G09G 5/00; H04N 5/46; H04N 5/64
(52) U.S. Cl. .......................... 345/1.1; 348/558; 348/744
(58) Field of Search .......................... 345/1.1, 1.2, 3.1, 345/3.2, 3.3, 903; 348/744, 745, 383, 555, 558

(56) References Cited
U.S. PATENT DOCUMENTS
5,790,096 A * 8/1998 Hill, Jr. ...................... 348/443
5,917,552 A * 6/1999 Van Court ................... 348/558
6,222,593 B1 * 4/2001 Higurashi et al. .......... 348/745

FOREIGN PATENT DOCUMENTS
JP      08146922 A      6/1996

* cited by examiner

Primary Examiner—Chanh Nguyen
Assistant Examiner—Paul A. Bell
(74) Attorney, Agent, or Firm—Birch, Stewart, Kolasch & Birch, LLP

(57) ABSTRACT

The present invention aims to provide projectors for use in a multi-display system which allows images having arbitrary formats to be easily displayed in a variety of display patterns. To achieve this object, the projector in accordance with the present invention have the input pattern memory storing input format parameters and display pattern memory storing display parameters. The source images are processed based on the input format parameters and the display parameters, whereby the source images having different formats are displayed in a variety of display patterns.

7 Claims, 6 Drawing Sheets

| INPUT FORMAT PARAMETERS | INPUT MEMORY NUMBER | | |
| --- | --- | --- | --- |
| | INPUT MEMORY 1 | INPUT MEMORY 2 | INPUT MEMORY 3 |
| TOTAL DOTS | 1344 dots | 1056 dots | 858 dots |
| TOTAL LINES | 806 lines | 816 lines | 418 lines |
| ACTIVE PIXELS | 1024 dots | 800 dots | 720 dots |
| ACTIVE LINES | 768 lines | 600 lines | 480 lines |
| INITIAL ACTIVE PIXEL | 236 dots | 216 dots | 120 dots |
| INITIAL ACTIVE LINE | 35 lines | 27 lines | 40 lines |

Fig.6

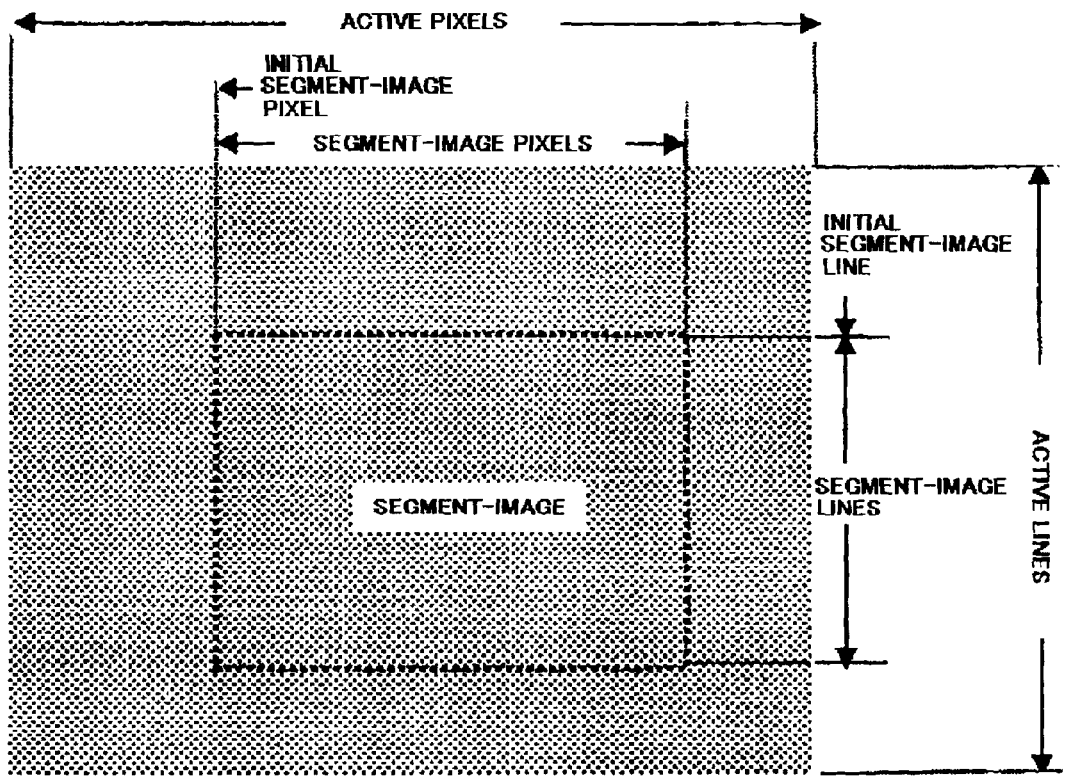

Fig.7

| DISPLAY PARAMETERS | DISPLAY MEMORY NUMBER | | | |
|---|---|---|---|---|
| | DISPLAY MEMORY1 | DISPLAY MEMORY 2 | DISPLAY MEMORY 3 | DISPLAY MEMORY4 |
| INITIAL SEGMENT-IMAGE PIXEL | 0 dot | 512 dots | 0 dot | 400 dots |
| SEGMENT-IMAGE PIXELS | 1024 dots | 512 dots | 800 dots | 400 dots |
| INITIAL SEGMENT-IMAGE LINE | 0 line | 384 lines | 0 line | 300 lines |
| SEGMENT-IMAGE LINES | 768 lines | 384 lines | 600 lines | 300 lines |
| HORIZONTAL OFFSET | 0 dot | 0 dot | 0 dot | 0 dot |
| HORIZONTAL DISPLAY-IMAGE SIZE | 1028 dots | 1028 dots | 1024 dots | 1024 dots |
| VERTICAL OFFSET | 0 line | 0 line | 0 line | 0 line |
| VERTICAL DISPLAY-IMAGE SIZE | 772 lines | 772 lines | 768 lines | 768 lines |
| INPUT MEMORY NUMBER | 1 | 1 | 2 | 2 |

Fig. 8A
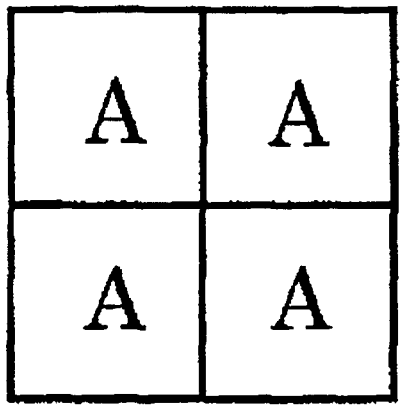
Fig. 8B
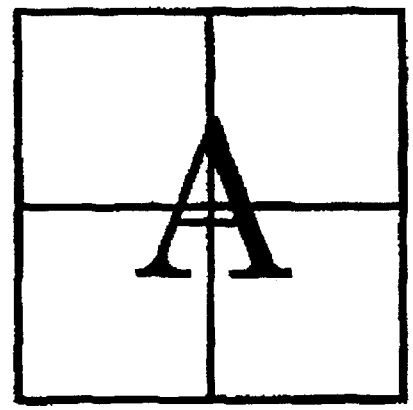
Fig.9
| OUTPUT FORMAT PARMETERS | OUTPUT FORMAT |
|---|---|
| DOT CLOCK | 65MHz |
| HORIZONTAL SYNCHRONOUS LINES | 6 lines |
| VERTICAL SYNCHRONOUS PIXELS | 136 dots |
| TOTAL DOTS | 1344 dots |
| TOTAL LINES | 806 lines |
| OUTPUT PIXELS | 1024 dots |
| OUTPUT LINES | 788 lines |
| INITIAL OUTPUT PIXEL | 236 dots |
| INITIAL OUTPUT LINE | 35 lines |

MULTI DISPLAY PROJECTOR

BACKGROUND OF THE INVENTION

1. Field of the Invention

The present invention relates to a multi-display system, and more particularly to projectors constituting the multi-display system.

2. Description of the Related Art

A multi-display projector constitutes one screen by arranging a plurality of rear-projection-type projector units in both vertical and horizontal direction, and is widely used as a large screen display. In recent years, multi-display projectors are used to display the images generated by personal computers (PCs) for purpose of presentations. However, conventional multi-display projectors mainly deal with NTSC signals or high-definition television signals, while the image signals generated by PCs have various kinds of formats in terms of pixels per line and lines per frame. Therefor, it has been difficult for conventional multi-display projectors to display the image having different format.

It is therefor, a primary object of the invention to provide a multi-display projector that is capable of processing and displaying the images having different formats.

SUMMARY OF THE INVENTION

This object is achieved in accordance with one aspect of the present invention, a multi-display projector, comprises the input pattern memory storing input format parameters and display pattern memory storing display parameters. The input format parameters specify the number of active pixels, the number of active lines, the initial active pixel, and the active initial line of input image signals, and the display parameters designate a region of an image to be displayed. Source images are processed based on the input format parameters and the display parameters, whereby the source images having different formats are displayed in a variety of display patterns.

The above and other objects, and features of the present invention will be clear from the following detailed description of the preferred embodiments of the invention in conjunction with the accompanying drawings.

BRIEF DESCRIPTION OF THE DRAWINGS

FIG. 6 is a conceptual diagram illustrating display parameters;

FIG. 7 is showing an example of display parameters;

FIGS. 8A and 8B is showing an example of a display pattern.

FIG. 9 is showing an example of output parameters;

DESCRIPTION OF THE PREFERRED EMBODIMENTS

Figure 1:
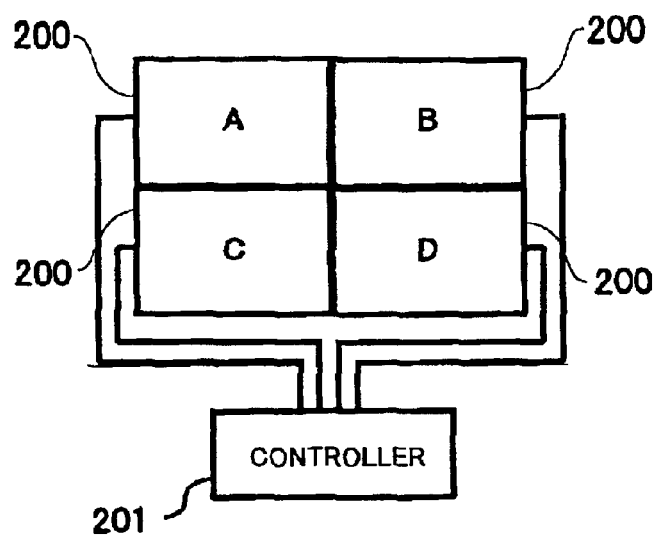
FIG. 1 is a diagram showing the overall configuration of a multi-display projector in accordance with one embodiment of the present invention.
Figures 3, 4:
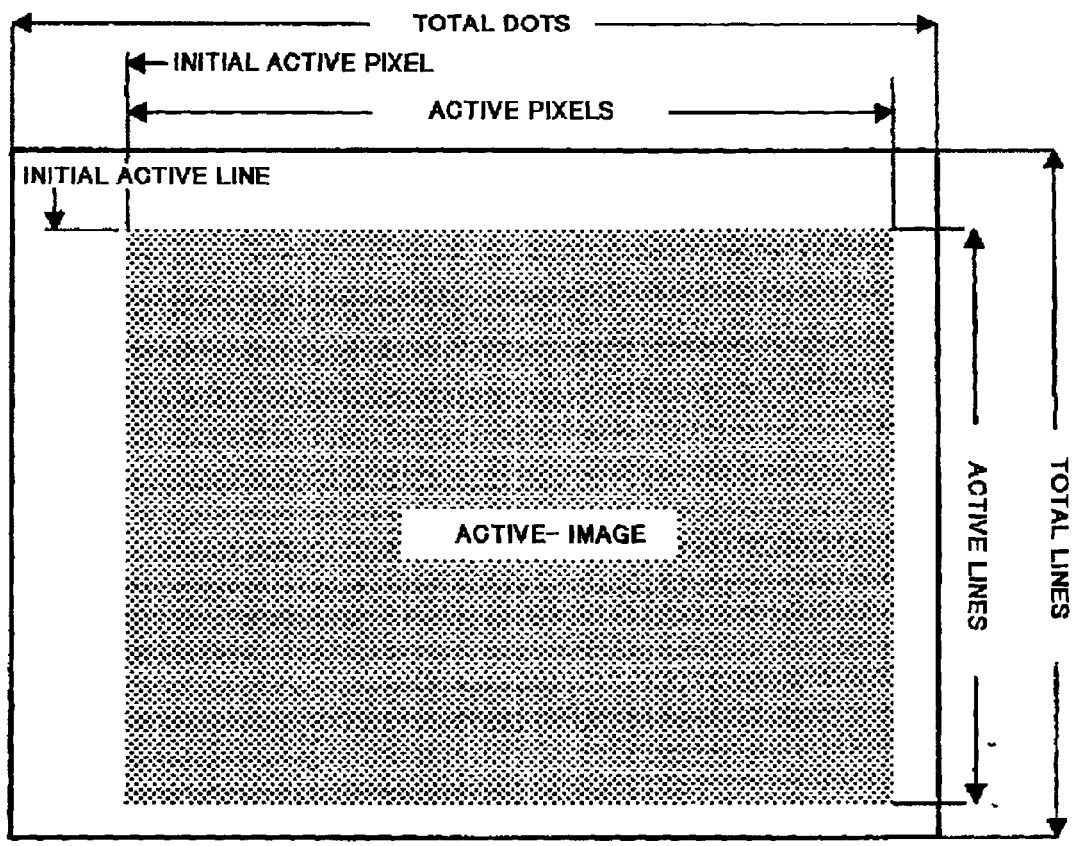
FIG. 3 is a conceptual diagram illustrating input format parameters.
FIG. 4 is showing examples of input format parameters.

FIG. 1 shows the overall configuration of a multi-display system in accordance with an embodiment of the present invention. The multi-display system shown in FIG. 3 is constituted of four projector units A, B, C and D indicated by reference numeral 200. Controller 201 controls each of these projector units.

Figure 2:
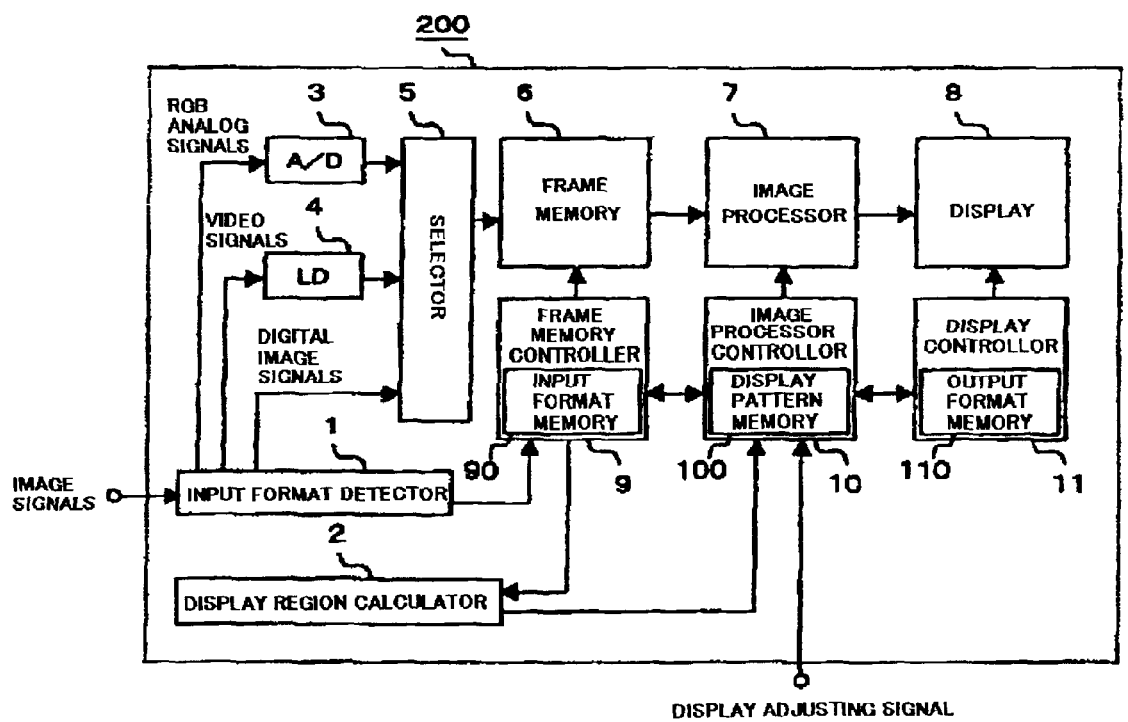
FIG. 2 is a block diagram showing the configuration of a multi-display projector unit in accordance with the one embodiment of the present invention.

FIG. 2 shows the configuration of each of the projector units shown in FIG. 3. The input format detector 1 detects input format parameters which specify the number of total dots, the number of total lines, the number of active pixels, the number of active lines, the initial active pixel, and the initial active line of the input image. FIG. 3 is the conceptual diagram illustrating these input format parameters specifying the number of total dots, the number of total lines, the number of active pixels, the number of active lines, the initial active pixel, and the initial active line of the input image. The detected input format parameters are stored in the input format memory 90. FIG. 4 shows the example of the input format parameters. When n kinds of image signals are inputted to the projector unit, n groups of format parameters are stored in the input format memory 90. "INPUT MEMORY NUMBER" illustrated in FIG. 6 indicates the memory area where the groups of input format parameters are stored. Although not shown in the FIG. 4, the input format memory 90 stores other input format parameters such as FAIN adjustment values, clamp information, mask information of PLL, etc. to set up A/D converter 3. The input format memory 90 also stores other input format parameters for video signals to set up the line doubler 4.

As shown in the FIG. 4, the input format detector 1 outputs the RGB analog signal to the A/D converter 3, video signal (NTSC signals and PAL signals) to the line doubler 4, and digital image signal to the selector 5. The A/D converter 3 converts the input RGB analog signals to digital image signals and output them to the selector 5. The line doubler 4 converts the NTSC signals from interlace to non-interlace digital image signals and output them to selector 5. The selector 5 receives digital image signals from the A/D converter 3, the line doubler 4, and the input format detector 1. The selector 5 outputs selected image signals to the frame memory 6.

Here, it is essential that the input format parameters stored in the input format memory 90 must include at least the number of active pixels, the number of active lines, the initial active pixel, and the initial active line of the input image. These parameters are necessary to writ active-image signals to the frame memory 6.

Figure 5:
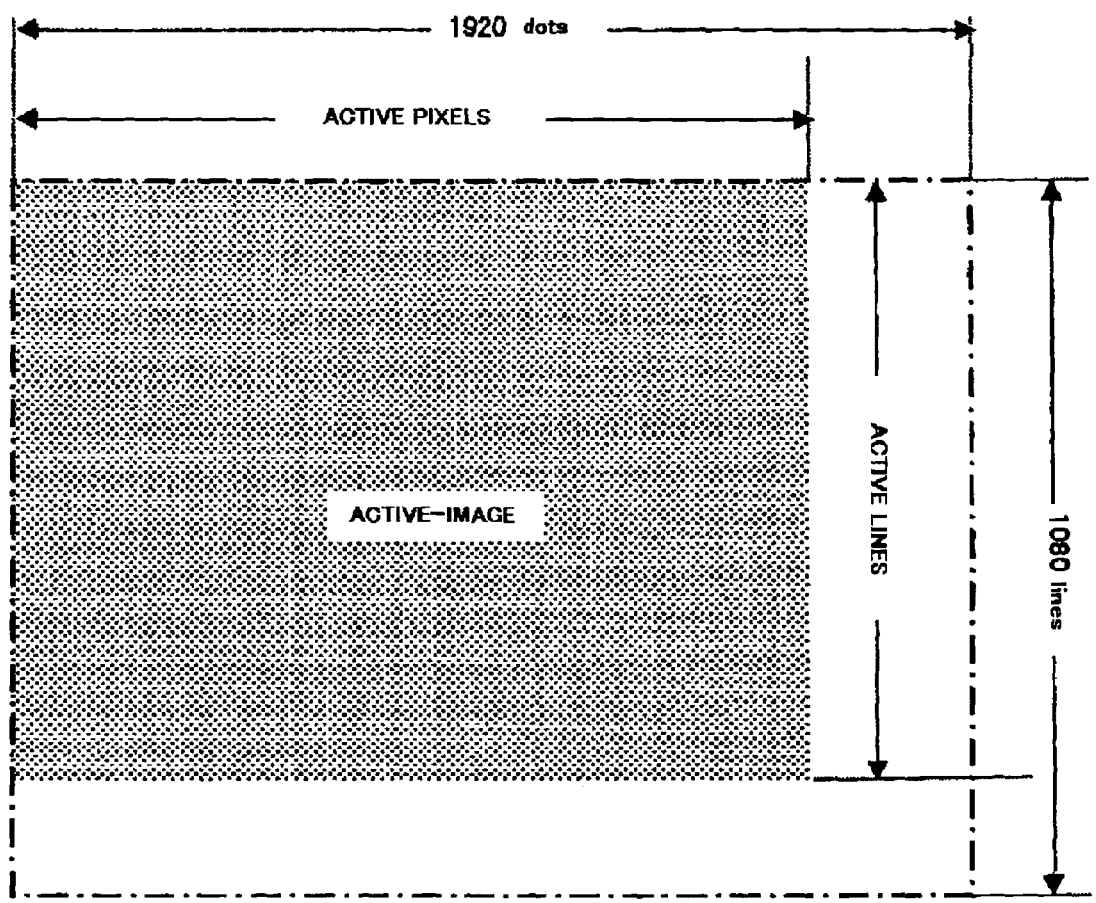
FIG. 5 is a conceptual diagram showing an active image stored in the frame memory.

The frame memory 6 stores the active-image extracted from whole image signals. Based on the input format parameters stored in the input format memory 90, the frame memory controller 90 controls the timing of writing the image signals to the frame memory 6, so that the active-image is stored in memory 6. The frame memory 6 has enough memory to store such signals as high-definition television signals having high resolution. For example, the frame memory 6 must be capable of storing image signals represented with 1920 dots×1080 lines (the number of active pixels and the number of active lines of high-definition television signals) to display high-definition television signals. In this case, as conceptually illustrated in FIG. 5, the frame memory 6 stores image signals from the upper left corner in memory address 0.

Based on the input format parameters stored in the input format memory 90, the display region calculator 2 calculates the display parameters which designate the region of the segment-image, a portion of the active image to be displayed. FIG. 6 is the conceptual diagram illustrating the display parameters. The display parameters include the number of segment-image pixels, the number of segment-image lines, the initial segment-image pixel, and the initial segment-image line. These display parameters are stored in the display pattern memory 100. FIG. 7 shows an example of display parameters. As shown in FIG. 7 the display pattern memory 100 stores other parameters, the horizontal display-image size, the vertical display-image size, and the horizontal offset, and the vertical offset. "INPUT MEMORY NUMBER", shown in FIG. 7, indicates the memory area where the input format parameters of the image signals to be processed with each set of the display parameters are stored. The horizontal offset and the vertical offset are variable parameters for shifting a image displayed on the screen in the horizontal direction and the vertical direction (Details of the horizontal position offset and the vertical position offset will be described later).

The display parameters provide various patterns of displaying images in the multi-display screens as shown in FIGS. 8A and 8B. FIG. 8A is an example of the display pattern produced by the display parameters stored in the "DISPLAY MEMORY 1" illustrated in FIG. 7. These display parameters are used to process the active-image stored in frame memory 6 into the image displayed in one of the projector units shown in FIG. 8A. FIG. 8B is another example of the display pattern produced by the display parameters stored in the "DISPLAY MEMORY 2" illustrated in FIG. 7. These display parameters are used to process the active-image stored in frame memory 6 into the image displayed in the projector units arranged in lower right shown in FIG. 8B. These display parameters are prepared for each of the input format to accommodate with the image signals having different format.

Each image displayed by projector units corresponds to the segment-image extracted from the active-image shown in FIG. 6. The image processor 7 extracts the segment-image signals and processes them. The image processor 7 enlarges or reduces the segment-image to appropriate size. The image processor controller 10 controls the image process mentioned above based on the display parameters.

Figure 10:
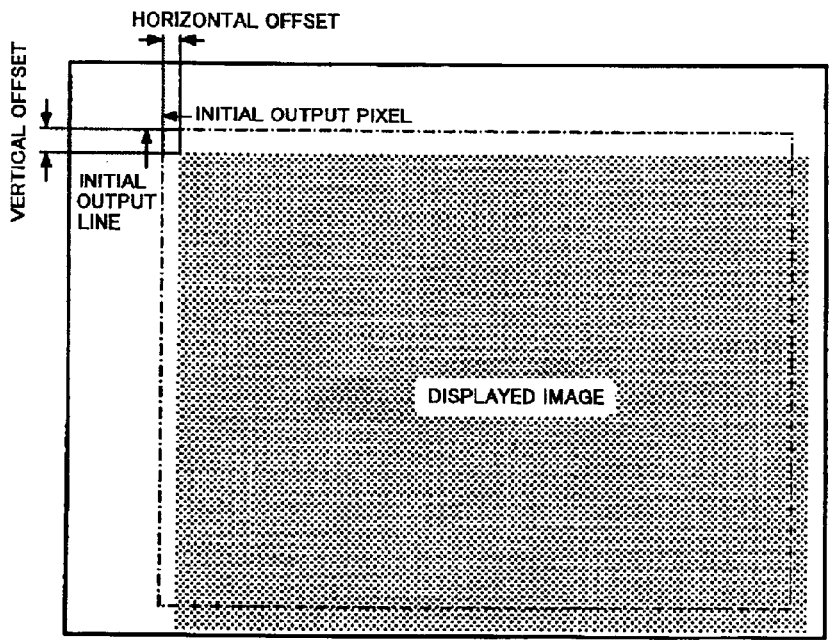
FIG. 10 is a conceptual diagram showing the horizontal offset and the vertical offset.

The images processed by the image processor 7 are displayed by display 8 in accordance with the output format parameters stored in the output format memory 110. FIG. 9 shows an example of output parameters stored in the output pattern memory 110. The initial output pixel and the initial output line designate the position where the image is displayed on the screen, which means the image displayed on the screen shifts by changing these parameters. The values of the initial output pixel and the initial output line are given by adding the horizontal offset and the vertical offset to their initial values. The horizontal offset and the vertical offset are variable parameters for shifting a display image from the initial position. Ordinarily, both of the horizontal offset and the vertical are 0, which means that the image is displayed in the predetermined position. However, when the deviation between optical system and the screen occurs, the displayed image shifts from the predetermined position as shown in FIG. 10. Therefor, it is necessary to shift the initial output pixel and the initial output line to display the image in the right position. In case the image shifts from the initial position, display adjustment signals are inputted to the display pattern memory 10, as shown in FIG. 2. The values of the horizontal offset and the vertical offset are changed by the display adjustment signals. Accordingly, the value of the initial output pixel and the initial output line stored in the output format memory 110 are rewritten, and the position where the image is displayed is corrected.

Figure 11:
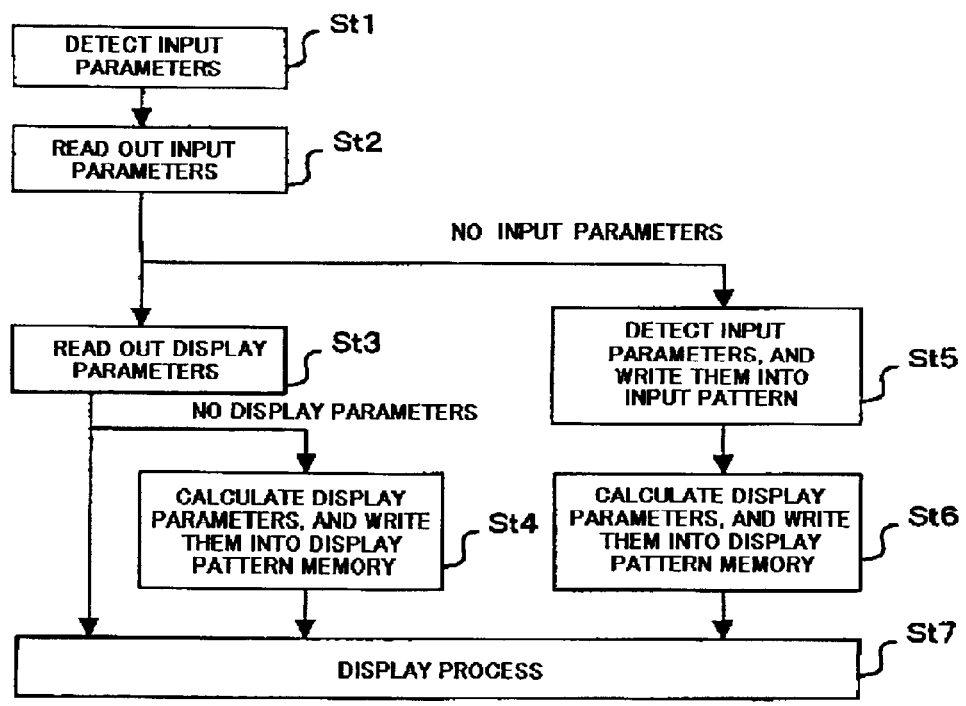
FIG. 11 is a flowchart showing the operation of the projector unit in accordance with the one embodiment of the present invention.

FIG. 11 is the flowchart showing the operation of the projector unit shown in FIG. 2. The input format detector detects the input format parameters of the input image signals (St1). The input format parameters corresponding to the input signals are read out from the input format memory 90 (St2), and the display parameters are read out from the display pattern memory 100 (St3). Based on these parameters the display operation starts (St7). If corresponding display parameters were not stored in the display pattern memory 100, the display region calculator 2 calculates them. The calculated display parameters are written into the display pattern memory 100 (St4), and then the display process starts (St7). If the input format parameters corresponding to the input image signals were not stored in the input format memory 90, the input format detector 1 detects them. The detected input format parameters are written into the input format memory 90 (St5). The display region calculator 2 calculates display parameters corresponding to the display patterns. The calculated display parameters are written into the display pattern memory 100 (St6), and the display process starts (St7).

As described above, the projector units have the input format memory 90 storing the input format parameters which specifies the number of active pixels, the number of active lines, the initial active pixel, and the initial active line. These projector units also have the display pattern memory 100 storing display parameters which specifies the initial pixel, the initial line of the segment-image, the number of segment-image pixels, and the number of segment-image lines. Therefore, the source images having different formats are displayed in a variety of display patterns.

The input format parameters and the display parameters are separately stored in the input format memory 90 and the display pattern memory 100 to prevent the redundancy of the data storing.

The frame memory 6 stores the active-image from which the segment image is extracted based on the display parameters. This configuration enables quick change of the display patterns, for example, the ones shown in FIG. 8A and FIG. 8B.

Moreover, the display parameters include variable parameters, the horizontal offset and the vertical offset, which designate the amounts of displacement of the display position in both horizontal and vertical direction. Therefore, when the optical system deviates and the image displayed on the screen shifts from the initial position, the displaying position of the image is easily corrected by rewriting the horizontal offset and/or the vertical offset.

While the present invention is described with the reference considered to be the preferred embodiments, it is to be understood that various changes and modifications is possible without departing from the scope of as set forth in the claims appended hereto.

What is claimed is:

1. A multi-display projector system comprising: a plurality of projectors, each projector comprising: an input format detector for detecting input format parameters from input image signals that have different formats; an input pattern memory for storing the input format parameters that specify a number of active pixels, a number of active lines, an initial active pixel, and an active initial line of the input image signals having different formats, said input format parameters being stored for each of said different formats; a frame memory for storing active image signals extracted from said input image signals based on said input format parameters; a display region calculator for calculating display parameters; a display pattern memory for storing the display parameters, which designate a region of an image to be displayed, each region of the image to be displayed is designated independently of a region designated in the other projectors; and a display unit that displays said region of the image by processing said active image signals stored in said frame memory based on said display parameters.

2. A multi-display projector claimed in claim 1, wherein said display parameters further include a horizontal offset and a vertical offset that designate an amount of displacement of a display position when the display position of the image is displaced horizontally and vertically; and wherein the position of a display image in the display unit is adjusted by changing values of said horizontal offset and said vertical offset.

3. A multi-display projector claimed in claim 1, further comprising:

an A/D converter for converting analog image signals to digital image signals, wherein the input pattern memory stores parameters of said A/D converter based on which the analog image signals are converted to said digital image signals.

4. A multi-display system comprising:

a plurality of multi-display projectors as claimed in claim 1, said multi-display projectors being arranged in both horizontal and vertical direction; and controlling means for controlling the operation of each of said multi-display projectors.

5. A method of projecting an image in a multi-display projector system, each projector performing the steps of: detecting input format parameters by an input format detector from input image signals, which have different formats; storing the input format parameters in an input format memory, the input format parameters specifying a number of active pixels, a number of active lines, an initial active pixel, and an active initial line of the input image signals, the input format parameters being stored for each of the different formats of the input image signals; storing active image signals that are extracted from the input image signals, the active image signals being stored in a frame memory on the basis of the input format parameters; calculating display parameters by a display region calculator; storing the display parameters in a display pattern memory, the display parameters designating a region of an image that is to be displayed, each region of the image to be displayed is designated independently of a region designated in the other projectors; and displaying the region of the image by processing the active image signals stored in the frame memory on the basis of the display parameters.

6. A multi-display system comprising: a plurality of projectors for displaying an image or a portion of an image, the plurality of projectors being arranged adjacent to one another, wherein each of the plurality of projectors includes: an input format detector for detecting input format parameters from input image signals that have different formats; an input format memory for storing the detected input format parameters, the input format parameters specifying a number of active pixels, a number of active lines, an initial active pixel, and an active initial line of the input image signals, the input format parameters being stored for each of the different formats of the input image signals; a frame memory for storing active image signals that are extracted from the input image signals, the active image signals being stored in a frame memory on the basis of the input format parameters; a display region calculator for calculating display parameters; a display pattern memory for storing the display parameters, which designate a region of an image that is to be displayed on the basis of a display adjusting signal, each region of the image to be displayed is designated independently of a region designated in the other projectors; and a display unit for displaying the region of the image by processing the active image signals stored in the frame memory on the basis of the display parameters.

7. The multi-display system according to claim 6, further comprising a controller for providing the display pattern memory with the display adjusting signal in order to designate the region of the image that is to be displayed.

* * * * *